(12) United States Patent
Sreekanth et al.

(10) Patent No.: US 10,337,736 B2
(45) Date of Patent: Jul. 2, 2019

(54) GAS TURBINE ENGINE COMBUSTOR AND METHOD OF FORMING SAME

(71) Applicant: Pratt & Whitney Canada Corp., Longueuil (CA)

(72) Inventors: Sri Sreekanth, Mississauga (CA); Douglas Maccaul, Varennes (CA); Eduardo Hawie, Woodbridge (CA); Ion Dinu, Candiac (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 450 days.

(21) Appl. No.: 14/808,456

(22) Filed: Jul. 24, 2015

(65) Prior Publication Data

US 2017/0023249 A1    Jan. 26, 2017

(51) Int. Cl.
| | | |
|---|---|---|
| F23R 3/00 | (2006.01) | |
| F23R 3/54 | (2006.01) | |
| F23R 3/60 | (2006.01) | |
| F23R 3/02 | (2006.01) | |
| F01D 9/04 | (2006.01) | |
| F01D 9/02 | (2006.01) | |

(52) U.S. Cl.
CPC .............. *F23R 3/002* (2013.01); *F01D 9/023* (2013.01); *F01D 9/041* (2013.01); *F23R 3/02* (2013.01); *F23R 3/54* (2013.01); *F05D 2230/232* (2013.01); *F05D 2230/80* (2013.01); *F05D 2240/35* (2013.01); *F23R 3/60* (2013.01); *F23R 2900/00018* (2013.01); *F23R 2900/03041* (2013.01); *Y02T 50/675* (2013.01)

(58) Field of Classification Search
CPC .... F23R 3/002; F23R 3/02; F23R 3/54; F23R 3/60; F01D 9/041; F02C 3/145
See application file for complete search history.

(56) References Cited

U.S. PATENT DOCUMENTS

| | | | | |
|---|---|---|---|---|
| 3,844,116 A | * | 10/1974 | Matto | F01D 9/023 60/760 |
| 4,133,633 A | * | 1/1979 | Fehler | F23R 3/02 431/352 |
| 4,195,475 A | | 4/1980 | Verdouw | |
| 4,195,476 A | * | 4/1980 | Wood | F23R 3/002 60/737 |
| 4,232,527 A | * | 11/1980 | Reider | F23R 3/08 60/754 |
| 4,785,623 A | * | 11/1988 | Reynolds | F23R 3/60 60/796 |

(Continued)

*Primary Examiner* — Todd E Manahan
*Assistant Examiner* — Eric Linderman
(74) *Attorney, Agent, or Firm* — Norton Rose Fulbright Canada LLP

(57) ABSTRACT

A gas turbine engine combustor is described which includes outer and inner annular combustor liners formed of sheet metal. The exit duct circumscribes an annular combustor exit and defines a combustion gas path. The exit duct includes a large exit duct having an annular forged metal section which is butt welded at an upstream end to the outer combustor liner to form a first annular joint. The annular forged metal section is fixed at a downstream end to an annular sheet metal wall to form a second annular joint. Methods of forming and of repairing a gas turbine engine combustor are also disclosed.

11 Claims, 4 Drawing Sheets

(56) References Cited

U.S. PATENT DOCUMENTS

| | | | | |
|---|---|---|---|---|
| 5,398,496 A * | 3/1995 | Taylor | F01D 9/023 | 60/752 |
| 6,079,199 A * | 6/2000 | McCaldon | F23R 3/54 | 60/755 |
| 6,253,538 B1 * | 7/2001 | Sampath | F23R 3/26 | 60/39.23 |
| 6,269,628 B1 * | 8/2001 | Gates | F01D 9/023 | 60/804 |
| 6,495,207 B1 * | 12/2002 | Prociw | F23R 3/007 | 427/245 |
| 6,530,971 B1 * | 3/2003 | Cohen | B23K 35/0244 | 148/24 |
| 7,302,801 B2 * | 12/2007 | Chen | F23R 3/54 | 60/733 |
| 7,350,358 B2 | 4/2008 | Patel et al. | | |
| 7,942,006 B2 * | 5/2011 | Critchley | F23R 3/06 | 60/745 |
| 8,397,512 B2 | 3/2013 | Hessler et al. | | |
| 9,657,949 B2 * | 5/2017 | Stastny | F23R 3/06 | |
| 2002/0162331 A1 * | 11/2002 | Coutandin | F23R 3/08 | 60/752 |
| 2002/0178734 A1 * | 12/2002 | Stastny | F23R 3/283 | 60/796 |
| 2004/0040307 A1 * | 3/2004 | Dimov | F23R 3/002 | 60/747 |
| 2004/0107574 A1 * | 6/2004 | Moertle | B23P 6/005 | 29/890.01 |
| 2005/0076650 A1 * | 4/2005 | Dudebout | F23R 3/54 | 60/804 |
| 2005/0120718 A1 * | 6/2005 | Markarian | F01D 9/023 | 60/800 |
| 2006/0042263 A1 * | 3/2006 | Patel | F23R 3/06 | 60/776 |
| 2006/0042271 A1 * | 3/2006 | Morenko | F23R 3/10 | 60/804 |
| 2006/0053797 A1 * | 3/2006 | Stastny | F23R 3/002 | 60/772 |
| 2006/0101828 A1 * | 5/2006 | Patel | F23R 3/60 | 60/804 |
| 2007/0227150 A1 * | 10/2007 | Alkabie | F23R 3/04 | 60/754 |
| 2007/0271926 A1 * | 11/2007 | Alkabie | F23R 3/06 | 60/772 |
| 2008/0148738 A1 * | 6/2008 | Rudrapatna | F23R 3/06 | 60/804 |
| 2010/0050650 A1 * | 3/2010 | Patel | B23P 6/005 | 60/754 |
| 2010/0095525 A1 * | 4/2010 | Shaw | B23P 6/002 | 29/888.021 |
| 2010/0236257 A1 * | 9/2010 | Grivas | F01D 9/023 | 60/801 |
| 2010/0257864 A1 * | 10/2010 | Prociw | F02C 3/145 | 60/758 |
| 2013/0283806 A1 * | 10/2013 | Monaghan | F23R 3/045 | 60/754 |
| 2014/0260275 A1 * | 9/2014 | Melton | F23R 3/20 | 60/740 |
| 2014/0290252 A1 | 10/2014 | Uemura et al. | | |
| 2014/0338346 A1 * | 11/2014 | Stastny | F23R 3/06 | 60/754 |
| 2014/0366544 A1 * | 12/2014 | Maccaul | F23R 3/002 | 60/752 |
| 2015/0113994 A1 * | 4/2015 | Hu | F23R 3/286 | 60/759 |
| 2015/0121885 A1 * | 5/2015 | Yokota | F23R 3/06 | 60/754 |
| 2015/0247641 A1 * | 9/2015 | Patel | F23R 3/28 | 60/776 |
| 2016/0040543 A1 * | 2/2016 | Stastny | F01D 9/023 | 60/796 |
| 2017/0363295 A1 * | 12/2017 | Stastny | F23R 3/54 | |
| 2017/0363296 A1 * | 12/2017 | Stastny | F23R 3/54 | |

* cited by examiner

GAS TURBINE ENGINE COMBUSTOR AND METHOD OF FORMING SAME

TECHNICAL FIELD

The application relates generally to gas turbine engines and, more particularly, to a combustor for gas turbine engines.

BACKGROUND

Many gas turbine engines combustors are formed having sheet metal walls. It is common to manufacture these sheet metals walls by seam welding several sheet metal components together, including to form the exit ducts of such combustors. However, seam welds undergo thermal stresses during engine operation as warmer parts of the sheet metal walls thermally expand, while colder parts of the sheet metal walls do not thermally expand, or expand less. This thermal imbalance is accentuated by the necessity of having an overlap at the seam weld between the two sheet metal walls. This overlap prevents cooling air from outside of the combustor from reaching the vicinity of the seam weld.

SUMMARY

In one aspect, there is provided a method of forming a combustor for a gas turbine engine, the method comprising: forming outer and inner annular combustor liners of sheet metal; and forming an exit duct at a downstream end of the outer and inner annular combustor liners, the exit duct including an annular forged metal section; and butt welding an upstream end of the annular forged metal section to the outer combustor liner to form a first annular joint, and welding fixing a downstream end of the forged metal section to an annular sheet metal wall to form a second annular joint, the annular sheet metal wall extending downstream from the forged metal section.

In another aspect, there is provided a gas turbine engine combustor, comprising outer and inner sheet metal combustor liners defining an exit duct at a downstream end, the exit duct circumscribing an annular combustor exit defining a combustion gas path therethrough, the exit duct including a large exit duct portion having an annular forged metal section, the annular forged metal section being butt welded at an upstream end thereof to the outer sheet metal combustor liner to form a first annular joint, the annular forged metal section being welded fixed at a downstream end thereof to an annular sheet metal wall to form a second annular joint, the annular sheet metal wall extending downstream from the annular forged metal section.

In a further aspect, there is provided an annular section of a gas turbine engine combustor, comprising: a forged metal annular body extending between an upstream end and a downstream end, the forged metal body upon installation of the annular section being butt welded along the upstream end to an outer sheet metal combustor liner to form a first annular joint, the forged metal body upon installation being fixed along the downstream end to an annular sheet metal wall to form a second annular joint.

There is also provided, in another alternate aspect, a method of repairing a gas turbine engine combustor, the method comprising: removing at least a section of a large exit duct of the combustor; replacing said removed section with an annular forged metal section; and butt welding an upstream end of the forged metal section to an upstream annular sheet metal wall of the large exit duct to form a first annular joint, and welding a downstream end of the forged metal section to a downstream annular sheet metal wall to form a second annular joint.

The method according to the above paragraph may also further comprises butt welding the downstream end of the forged metal section to the sheet metal wall to form the second annular joint.

DESCRIPTION OF THE DRAWINGS

Reference is now made to the accompanying figures in which.

DETAILED DESCRIPTION

Figure 1:
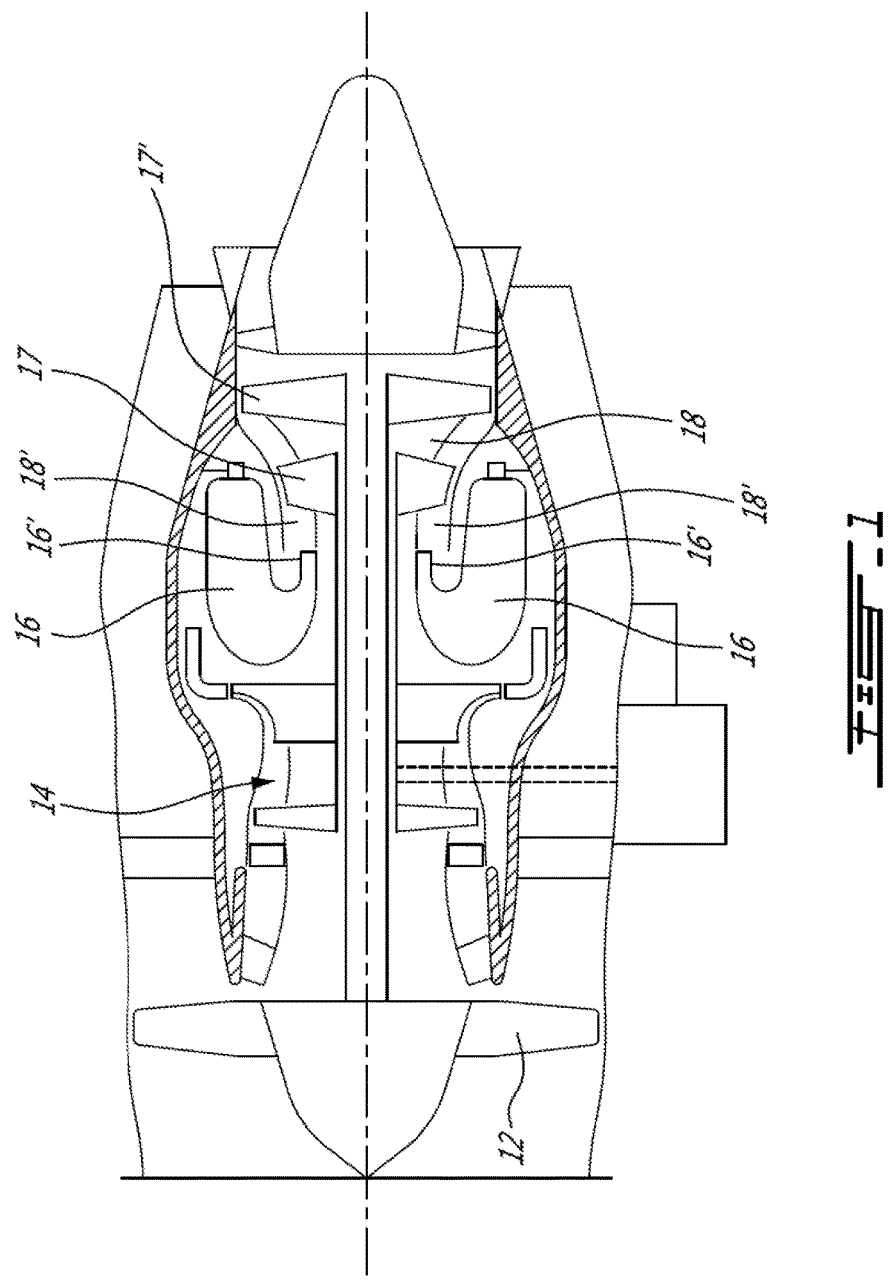
FIG. 1 is a schematic cross-sectional view of a gas turbine engine showing the location of a combustor and its exit duct, according to an embodiment of the present disclosure.

FIG. 1 illustrates a gas turbine engine 10, which is a turbofan in the depicted embodiment but may also be other types of gas turbine engines, preferably adapted for use in an aircraft and subsonic flight. The gas turbine engine 10 generally includes, in serial flow communication, a fan 12 through which ambient air is propelled, a multi-stage compressor 14 which pressurizes the air from the fan 12 and feeds it towards a combustor 16 in which the compressed air is mixed with fuel and ignited for generating an annular pressurized stream of combustion gases which exits from an exit duct 16' of the combustor 16 into a turbine section 18 having turbine rotors 17 and 17' for extracting energy from the combustion gases.

The combustor 16 disclosed herein may be fixed to a downstream component, such as a turbine vane assembly 18', in a manner preventing any substantial relative movement therebetween. While the use of sliding joints exists, these sliding joints being located between the end of the combustor exit and the downstream turbine vane assembly, the embodiments of the combustor 16 as described herein employ a fixed interconnection (e.g. using fasteners, welded connections, etc.) between the combustor exit duct 16' and the downstream turbine vane assembly 18'. In most embodiments, therefore, the combustor 16 disclosed herein does not have a sliding joint which permits relative movement along the longitudinal center axis of the gas turbine engine 10 when the combustor 16 and/or its components undergo thermal expansion.

When the combustion gases leave the combustor 16 via its exit duct 16', they are fed into the turbine vane assembly 18' disposed immediately downstream therefrom. The turbine vane assembly 18' includes a plurality of turbine vanes which, inter alia, guide the flow of combustion gases to the turbine rotors 17 downstream from therefrom. As will be seen, the combustor 16, and more particularly the exit duct 16' thereof, is configured to reduce the thermal stress at one or more of the welded annular joints of the exit duct 16' by directly exposing one or more of the welded annular joints to the cooler air circulating outside the combustor 16. This reduction in thermal stress helps to increase the fatigue life of the welded joint.

Figure 2:
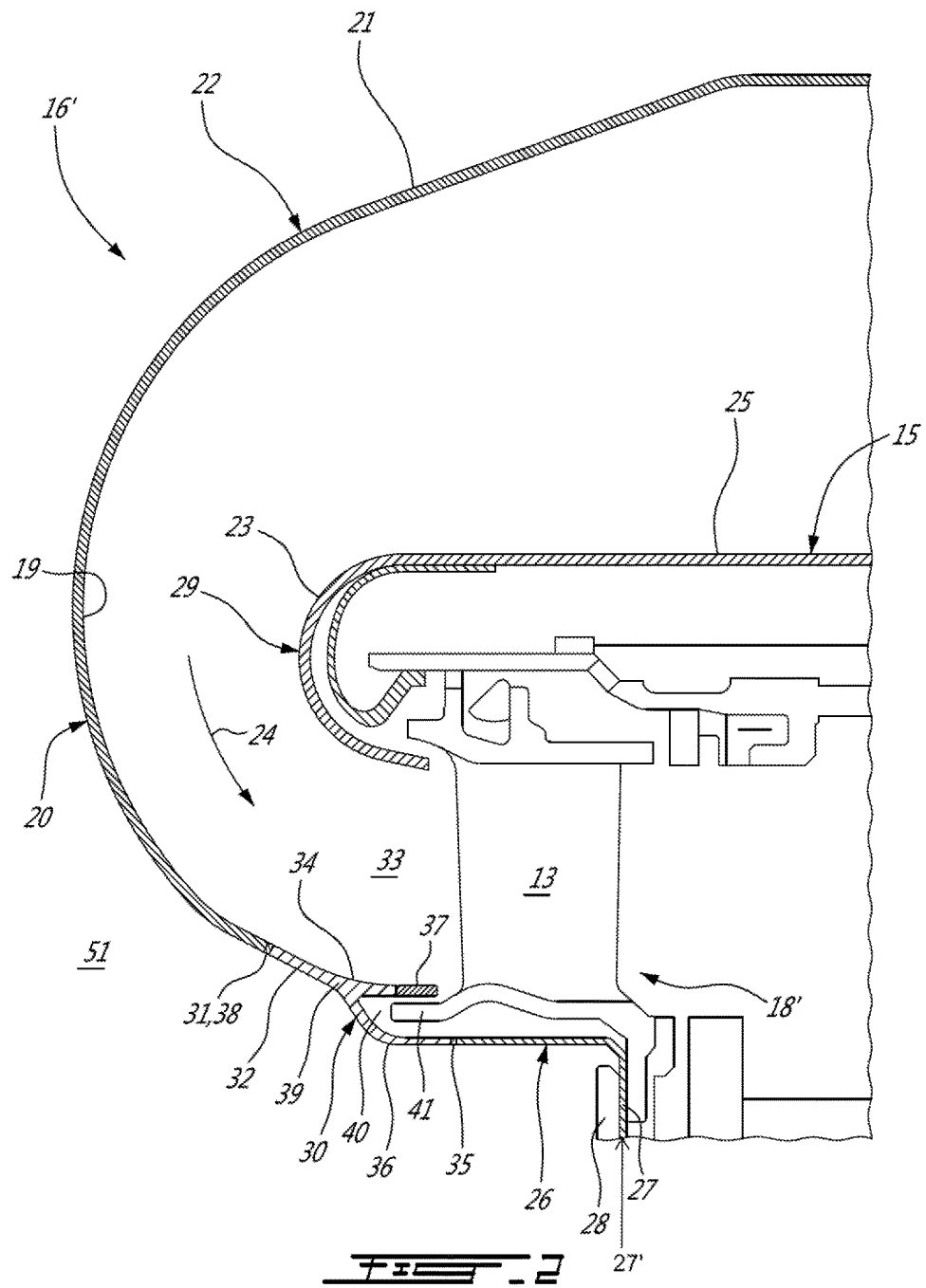
FIG. 2 is a cross-sectional view of the exit duct of FIG. 1.

Referring to FIG. 2, the exit duct 16' is formed of multiple formable metal sheets. The exit duct 16' includes generally an outer combustor sheet metal liner 22 and an inner combustor sheet metal liner 15 which are radially spaced apart to circumscribe and thus define between them an annular combustor exit 33. In the depicted embodiment, where the combustor 16 is a reverse flow combustor 16, the outer and inner combustor liners 22,15 of the exit duct 16' respectively comprise a Large Exit Duct (LED) portion 20 and a Small Exit Duct (SED) portion 29. The LED 20 is a section of the outer combustor liner 22, and includes a curved annular wall portion 19 and an outer wall portion 21 at an upstream end thereof. Similarly, the SED 29 includes an annular curved wall 23 which is integrally formed at an upstream end thereof with an inner wall 25 of the inner combustor liner 15.

The combustion gases flow along a combustion gas path 24 in a downstream direction. The combustion gas path 24 extends between the LED 20 and the SED 29. Together, the LED 20 and the SED 29 convey the combustion gases downstream toward the combustor exit 33 of the exit duct 16', and ultimately, into the turbine vanes 13 of the downstream turbine vane assembly 18'. The LED 20 is typically a continuous annular body about the longitudinal center axis of the gas turbine engine. The present disclosure generally relates to the LED 20 of the combustor, and reference to an "exit duct" herein designates the LED 20 unless stated otherwise. It will however be appreciated that the annular joints disclosed herein can also be used to join components of the SED 29 together.

Still referring to FIG. 2, the LED 20 includes a portion of the outer combustor liner 22 at an upstream end, an annular sheet metal wall 26 at a downstream end, and a forged metal section 30 connected to, and between, the outer combustor liner 22 and the sheet metal wall 26. A first annular joint 31 connects the forged metal section 30 to the outer combustor liner 22 at the upstream end of the LED 20. A second annular joint 35 connects the forged metal section 30 to the sheet metal wall 26 at the downstream end of the LED 20. Accordingly, the forged metal section 30 is permanently connected, by welding in accordance with the particular embodiment described herein, at both its upstream and downstream end with the respective sheet metal walls 22 and 26 of the LED 20. As will be seen in further detail below, at least the first annular joint 31 is a butt-welded joint formed between the upstream sheet metal wall 22 and the forged metal section 30, such that no overlap between the upstream sheet metal wall 22 and the forged metal section 30 exists.

The forged metal section 30 is an annular metal piece that is inserted between two sheet metal sections of the LED 20, and forms an annual flange defining a radially extending annular gap 40 therein which is adapted to receive the turbine vane platform(s) 41 of the turbine vane assembly 18'.

The forged metal section 30 achieves its shape and strength during a forging manufacturing process, which forms and shapes the forged metal section 30 using localized compressive forces. In a typical forging process, a mold is made in the final shape of the forged metal section 30. A plate or ingot of suitable metal is placed within the mold after being heated. High pressures are applied to the metal by a suitable compression tool. The high pressures cause the metal to flow throughout the mold such that when the mold is open, a roughly-formed metal piece in the shape of the forged metal section 30 is created. The roughly-formed metal piece can be machined or finished before installation in the LED 20, or undergo other chemical or mechanical treatments.

The forged metal section 30 is not formed from sheet metal. In contrast to the forging process described above, sheet-metal forming involves the use of metal stock consisting of sheet, strip, or ribbon metal. Sheet-metal forming is used in the production of flat and folded articles where the thickness of the final part is considerably less than the other dimensions. Sheet-metal forming (especially cold stamping) does not usually require metal cutting to finish the sheet metal.

The forged metal section 30 can take any suitable shape. In the embodiment shown in FIG. 2, the forged metal section 30 has an upstream hot wall segment 32 which extends upstream toward the curved wall portion 19 and faces the combustion gas path 24. A downstream hot wall segment 34 of the forged metal section 30 also faces the combustion gas path 24, and extends substantially parallel to the center axis of the gas turbine engine toward the turbine vane assembly 18'.

In conventional combustor exit ducts, a component similar to the downstream hot wall segment may be at risk of oxidation due to its position within the combustion gas path 24. The downstream hot wall segment 34 of the present disclosure may therefore be made shorter, and have a more easily replaceable extension exit lip 37 attached thereto. The exit lip 37 can be butt welded to an extremity of the downstream hot wall segment 34 and extend away therefrom. The presence of the replaceable exit lip 37 facilitates repair of the forged metal section 30. The exit lip 37 may also be made of a different material than that of the forged metal section 30 with better oxidation properties.

The forged metal section 30 also has a downstream cold wall segment 36 which is radially spaced outwardly from the downstream hot wall segment 34 to define a radial gap therebetween. Such an embodiment of the forged metal section 30 positions or spaces the upstream end of the forged metal section 30 radially apart from its downstream end. The radially outward spacing of the downstream cold wall segment 36 and its disposition outside of the combustion gas path 24 helps to reduce its exposure to the relatively hot combustion gases. It may therefore experience less thermal expansion, and thus, less thermal stress than components facing or within the combustion gas path 24.

An intersection of the upstream hot wall segment 32, the downstream hot wall segment 34, and the downstream cold wall segment 36 define a thickness 39 of metal of the forged metal section 30. A thickness 39, which may be at least partially in the radial direction, of the forged metal section 30 may help the forged metal section 30 to better resist thermal stresses. A component having such a thickness 39 cannot be easily formed out of sheet metal, if it can be formed at all. Furthermore, in at least one embodiment, the forged metal section 30 includes a number of cooling holes extending fully radially therethrough and dispersed axially along the forged metal section 30 for allowing the passage of cooler air therethrough.

As mentioned above, the upstream end of the forged metal section 30 is butt welded to the downstream end of the sheet metal outer combustor liner 22 by the first annular joint 31 of the LED 20. More particularly, with the forged metal section 30 shaped as shown in FIG. 2, the upstream hot wall segment 32 of the forged metal section 30 is butt welded to the sheet metal outer combustor liner 22 to form the first annular joint 31.

The terms "butt weld", "butt welded", or "butt welding" as used herein refer to a weld that joins two components together, in this case the forged metal section 30 and the curved wall portion 19 of the outer combustor liner 22, without any overlap. As such, the two "butt ends" of the welded components are abutted together and welded in place, without either of the components overlapping each other. The butt welded joint may be made by gradually heating up the two weld ends with a weld plate and then joining them under a specific pressure. The weld at the joint can then be ground or machined to provide a smooth finish, and can be further processed if desired.

The butt welded joint(s) 31, 35 of the LED 20 differ from overlapping seam welds of the prior art. These prior art seam welds are used to join sheet metal components in a combustor by overlapping parts of the sheet metal and fusing the overlapped sheets together. Such seam welds may have high stresses due to the thermal growth mismatch of the two sheet metal walls it attaches, one being relatively hot and the other relatively cold. The thermal imbalance is accentuated by the necessity of having an overlap required by the seam weld. The overlap of the seam weld prevents the cooling air from outside of the combustor from reaching the areas in the vicinity of the seam weld.

The butt weld 38 of the first annular joint 31 may therefore contribute to reducing thermal imbalance between the hotter upstream outer combustor liner 22 and the forged metal section 30, thus contribute to reducing stresses at the joint. Since neither the outer combustor liner 22 or the forged metal section 30 overlap one another at the first annular joint 31, the first annular joint 31 is directly exposed on its outer surface to the plenum 51 surrounding the exit duct 16', the plenum 51 having pressurized cooling air therein during operation of the engine.

A downstream end of the forged metal section 30 is welded to an upstream end of the annular sheet metal 26 to form the second annular joint 35 of the LED 20. Since the second annular joint 35 may not be disposed within, or exposed directly to, the hot combustion gas path 24, it may undergo less stress, and therefore it is not necessary to have a butt welded second annular joint 35. Indeed, the second annular joint 35 may be exposed to lower temperatures because it may be shielded by a component of the turbine vane assembly 18', or because it is not directly exposed to the combustion gas path 24.

Accordingly, while other weld or fastening techniques may be used at the second annular joint 35, the downstream end of the forged metal section 30 may nevertheless also be butt welded to the sheet metal wall 26 to form the second annular joint 35. More particularly, with the forged metal section 30 shaped as shown in FIG. 2, the downstream cold wall segment 36 of the forged metal section 30 may be butt welded to the sheet metal wall 26 to form the second annular joint 35. The second annular joint 35 is spaced radially from the first annular joint 31, given the forked cross-sectional shape of the forged metal section defining the radially extending annular gap 40 therebetween, at the downstream end of the exit duct 16'. As explained above, this radially extending annular gap 40 may help to cool the downstream cold wall segment 36, and allow the insertion of the platform 41 of the turbine vane assembly 18' between the downstream hot wall segment 34 and the downstream cold wall segment 36. When the second annular joint 35 is butt-welded, the outer surface of second annular joint 35 will also be exposed to the cooling air from outside the exit duct 16'.

The annular sheet metal wall 26 is the downstream component of the LED 20. As can be seen in FIG. 2, the upstream end of the annular sheet metal wall 26 is welded to the forged metal section 30, and the downstream extremity 27' of the sheet metal wall 26 may include a radially extending flange 27 that is fastened in a fixed manner to the turbine vane assembly 18' and/or another fixed supporting flange 28 of the engine, such as by welding, bracing, or mechanical fastening. The sheet metal wall 26 therefore serves as a support and locating feature against downstream structure (e.g. the turbine vane assembly 18'), and/or vice versa. Relative axial movement between the turbine vane assembly and the exit duct of the combustor is thereby prevented. The exit duct 16' is therefore fixedly attached to the turbine vane assembly 18', in contrast to combustors having sliding joints that permit relative movement between the turbine vane assembly and the downstream end of the combustor exit duct.

It can thus be appreciated that the forged metal section 30, although not a sheet metal component itself, is welded at both of its extremities to sheet metal components (i.e. the outer combustor liner 22 and the sheet metal wall 26) by the first and second joints 31, 35 respectively.

Figure 3:
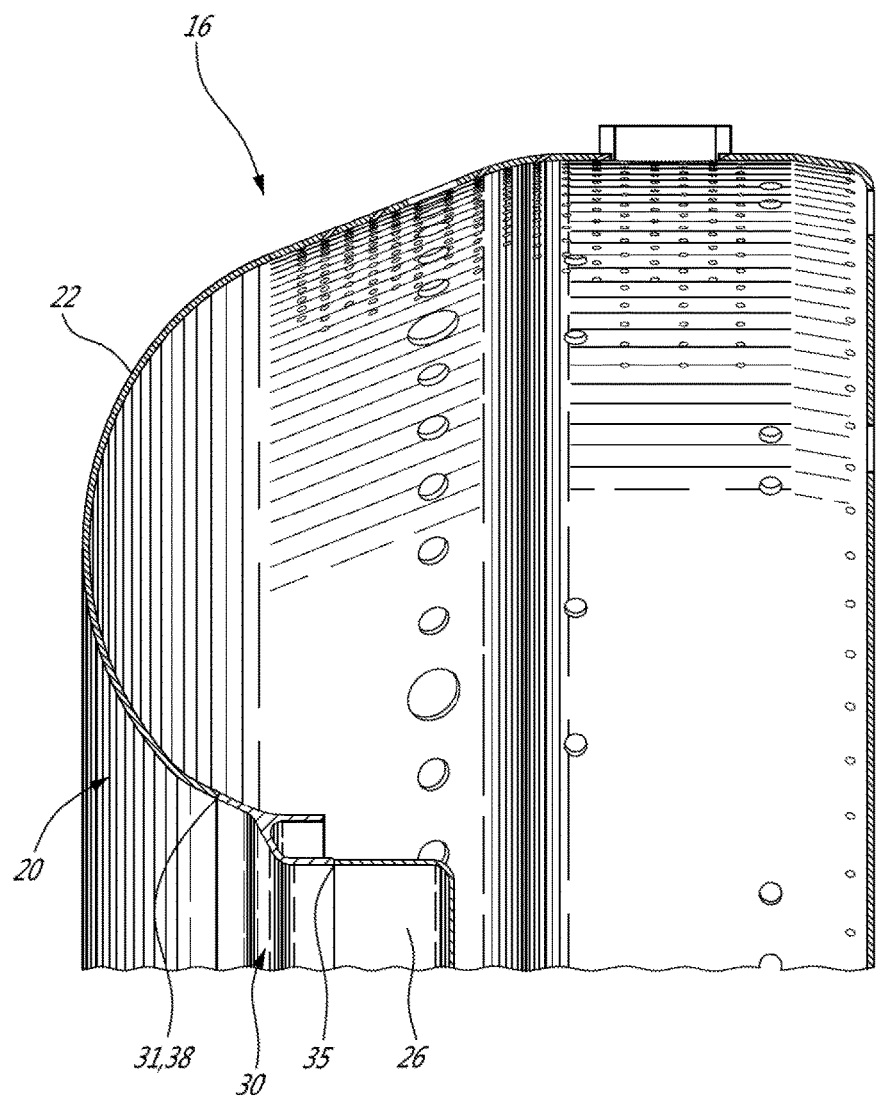
FIG. 3 is a perspective cross-sectional view of an outer combustor liner of the combustor of FIG. 1.
Figure 4:
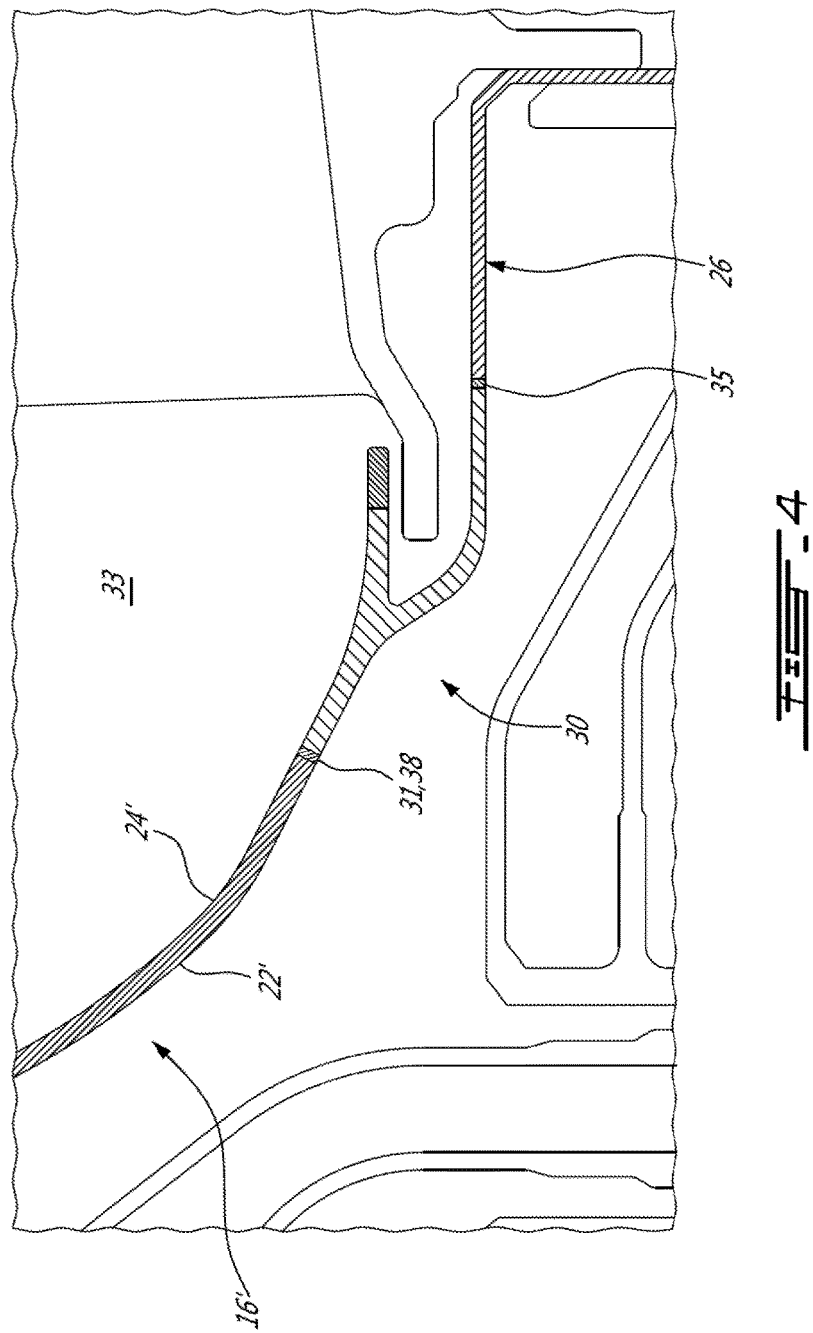
FIG. 4 is an enlarged cross-sectional view of part of the exit duct shown in FIG. 2.

Referring now to FIGS. 3 and 4, there is also disclosed a method of forming a gas turbine engine combustor 16. The method includes forming an annular combustor exit 33 with an annular outer combustor liner 22 and an annular inner combustor liner, where both the outer and inner combustor liners are formed of sheet metal.

The method also includes forming an exit duct 16' between the outer and inner combustor liners by butt welding an upstream end of the annular forged metal section 30 to the outer combustor liner 22 to form a first annular joint 31. The method also includes welding a downstream end of the forged metal section 30 to the annular sheet metal wall 26 to form the second annular joint 35.

Still referring to FIGS. 3 and 4, there is also disclosed a method of repairing a gas turbine engine combustor 16. The method includes removing at least a section of the LED 20 of the combustor 16. The section can be removed by cutting, debolting, or otherwise removing the section. The removed section of the LED 20 can be an upstream or downstream section, depending on where there is a need for repairs, and may be formed of sheet metal.

The method also includes the removed section with the annular forged metal section 30, as shown in FIGS. 3 and 4. The method also includes butt welding an upstream end of the forged metal section 30 to an upstream annular sheet metal wall (typically the outer combustor liner 22) of the LED 20 to form the first annular joint 31, and welding a downstream end of the forged metal section 30 to a downstream annular sheet metal wall 26 to form the second annular joint 35. As explained above, the second annular joint 35 can also be formed by a butt weld.

It can thus be appreciated that the formation of one or more butt welded annular joints in the LED 20 is an improvement over the seam welds of conventional sheet metal LEDs in that the butt weld helps to reduce the thermal imbalance because the annular joint does not have any overlapping parts, thus the joint is exposed on one of its side to cooling. Furthermore, the use of a forged metal section 30 rather than sheet metal allows for the butt welded joints, as well as for the creation of a specific and complex shape. This may not be possible with sheet metal, and especially a single piece of sheet metal, because such a complicated sheet metal liner may not be able to accommodate the expansion resulting from thermal sources. Therefore, the use of one or more butt weld to attach the forged metal section 30 to the neighbouring sheet metal combustor parts may be used in situations where localised hot spots are present.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine combustor, comprising outer and inner sheet metal combustor liners defining an exit duct at a downstream end, the exit duct having a large exit duct portion and a small exit duct portion together forming an annular combustor exit defining a combustion gas path therethrough, the large exit duct portion being radially inward of the small exit duct portion at the annular combustor exit and having an annular forged metal section, a first annular joint between the outer sheet metal combustor liner and the annular forged metal section including a butt weld connecting an upstream end of the annular forged metal section to the outer sheet metal combustor liner, there being no overlap of the annular forged metal section and the outer sheet metal combustor liner at the first annular joint, a second annular joint between a downstream end of the annular forged metal section and an annular sheet metal wall, the annular forged metal section having a downstream hot wall segment facing the combustion gas path and a downstream cold wall segment radially spaced away from the downstream hot wall segment to define a radial gap therebetween adapted to receive a turbine vane platform therein, the downstream cold wall segment being butt welded to the sheet metal wall to form the second annular joint, the annular sheet metal wall extending downstream from the annular forged metal section.

2. The gas turbine engine combustor as defined in claim 1, wherein the downstream cold wall segment of the annular forged metal section is disposed outside of said combustion gas path.

3. The gas turbine engine combustor as defined in claim 1, wherein a downstream extremity of the annular sheet metal wall is fixed to a turbine vane assembly to prevent relative axial movement between the turbine vane assembly and the exit duct of the gas turbine engine combustor.

4. The gas turbine engine combustor as defined in claim 1, wherein the downstream hot wall segment of the annular forged metal section has an exit lip, the exit lip being butt welded to an extremity of the downstream hot wall segment and extending away therefrom.

5. The gas turbine engine combustor as defined in claim 1, wherein an outer surface of the first annular joint is exposed to air from outside the gas turbine engine combustor.

6. An annular section of a gas turbine engine combustor, comprising: an outer sheet metal combustor liner having a downstream end; a forged metal annular body extending between an upstream end and a downstream end thereof; a first annular joint disposed between the outer sheet metal combustor liner and the forged metal annular body, the first annular joint including a butt weld interconnecting the upstream end of the forged metal annular body and the downstream end of the outer sheet metal combustor liner, there being no overlap of the forged metal annular body and the outer sheet metal combustor liner at the first annular joint; and a second annular joint disposed between and interconnecting the forged metal annular body and an annular sheet metal wall, the forged metal annular body having a downstream hot wall segment and a downstream cold wall segment radially spaced away from the downstream hot wall segment to define a radial gap therebetween, the downstream cold wall segment being butt welded to the annular sheet metal wall to form the second annular joint.

7. The gas turbine engine combustor as defined in claim 1, wherein the annular forged metal section is free of sheet metal.

8. The gas turbine engine combustor as defined in claim 1, wherein the downstream end of the annular forged metal section and the sheet metal wall do not overlap at the second annular joint.

9. The annular section as defined in claim 6, wherein the downstream cold wall segment of the forged metal annular body is disposed outside of said combustion gas path upon installation of the annular section of the gas turbine engine combustor.

10. The annular section as defined in claim 6, wherein the downstream hot wall segment of the forged metal annular body has an exit lip, the exit lip upon installation being butt welded to an extremity of the downstream hot wall segment and extending away therefrom.

11. The annular section as defined in claim 6, wherein an outer surface of the first annular joint is exposed to air from outside the gas turbine engine combustor upon installation.

* * * * *